United States Patent [19]

Reichner

[11] Patent Number: 4,808,491
[45] Date of Patent: Feb. 28, 1989

[54] CORNER HEATING IN RECTANGULAR SOLID OXIDE ELECTROCHEMICAL CELL GENERATORS

[75] Inventor: Philip Reichner, Plum Boro, Pa.

[73] Assignee: Westinghouse Electric Corp., Pittsburgh, Pa.

[21] Appl. No.: 156,065

[22] Filed: Feb. 16, 1988

[51] Int. Cl.[4] .............................................. H01M 8/10
[52] U.S. Cl. ...................................... 429/13; 429/26; 429/30
[58] Field of Search ............... 429/13, 26, 30, 34, 429/120, 32

[56] References Cited

U.S. PATENT DOCUMENTS

| | | | |
|---|---|---|---|
| 3,718,506 | 2/1973 | Fischer et al. | 429/24 |
| 4,395,468 | 6/1983 | Jsenberg | 429/31 |
| 4,520,082 | 5/1985 | Makiel | 429/26 |

Primary Examiner—Anthony Skapars
Attorney, Agent, or Firm—Daniel P. Cillo

[57] ABSTRACT

Disclosed is an improvement in a solid oxide electrochemical cell generator 1 having a rectangular design with four sides that meet at corners, and containing multiplicity of electrically connected fuel cells 11, where a fuel gas is passed over one side of said cells and an oxygen containing gas is passed into said cells, and said fuel is burned to form heat, electricity, and an exhaust gas. The improvement comprises passing the exhaust gases over the multiplicity of cells 11 in such a way that more of the heat in said exhaust gases flows at the corners of the generator, such as through channels 19.

10 Claims, 2 Drawing Sheets

CORNER HEATING IN RECTANGULAR SOLID OXIDE ELECTROCHEMICAL CELL GENERATORS

GOVERNMENT CONTRACT

The Government of the United States of America has rights in this invention pursuant to Contract No. DE-AC-0280ET-17089 awarded by the United States Department of Energy.

BACKGROUND OF THE INVENTION

In a typical solid oxide fuel cell generator configuration, a multiplicity of fuel cells are vertically mounted in a square pattern, and are electrically connected in series in the rows and in parallel in the columns of the pattern. Gaseous fuel is passed over the outside of the cells and an oxygen-containing gas is passed through the inside of the cells. Oxygen migrates through the cells as oxygen ions and burns the fuel, generating electricity and heat. Such generators are taught by Isenberg in U.S. Pat. No. 4,395,468 and Makiel in U.S. Pat. No. 4,520,082.

While most of the heat is removed by the flow of the gases, some heat is lost through the walls of the generator, causing the temperature in the center of the generator to be higher than the temperature at the periphery of the generator, especially at the corners. The presence of a large temperature gradient between the center of the generator and the periphery makes it more difficult to operate the generator within the optimal temperature range of about 800° C. to about 1100° C. As a result, temperatures at the center may exceed the optimum, resulting in a shorter cell life and the deterioration of materials, and temperatures at the periphery may fall below the optimum, resulting in inefficient cell operation and the loss of electricity. Efforts to solve this problem through the use of additional insulation have proved to be impractical or even counterproductive.

SUMMARY OF THE INVENTION

A more uniform temperature gradient can be obtained in a solid oxide electrochemical cell generator if the exhaust gases are passed over the outside of the periphery of the cells, with more of the exhaust gases flowing at the corners of the generator. In this way, the temperatures at the periphery of the generator are raised and the temperature gradient within the generator is reduced. As a result, it is much easier to operate the generator within the optimal temperature range, and temperature excursions above or below that range are less likely to occur.

In addition, the exhaust gases can be used to heat the incoming fuel at the bottom of the generator, allowing the possibility of internal reformation of fuel without a chilling effect. By internally heating the fuel, reforming is simplified and energy losses are reduced.

DESCRIPTION OF THE INVENTION

In order that the invention can be more clearly understood, convenient embodiments thereof will now be described, by way of example, with reference to the accompanying drawings in which:

FIG. 1A is a section through lines I—I in FIG. 2;

Figure 1A:
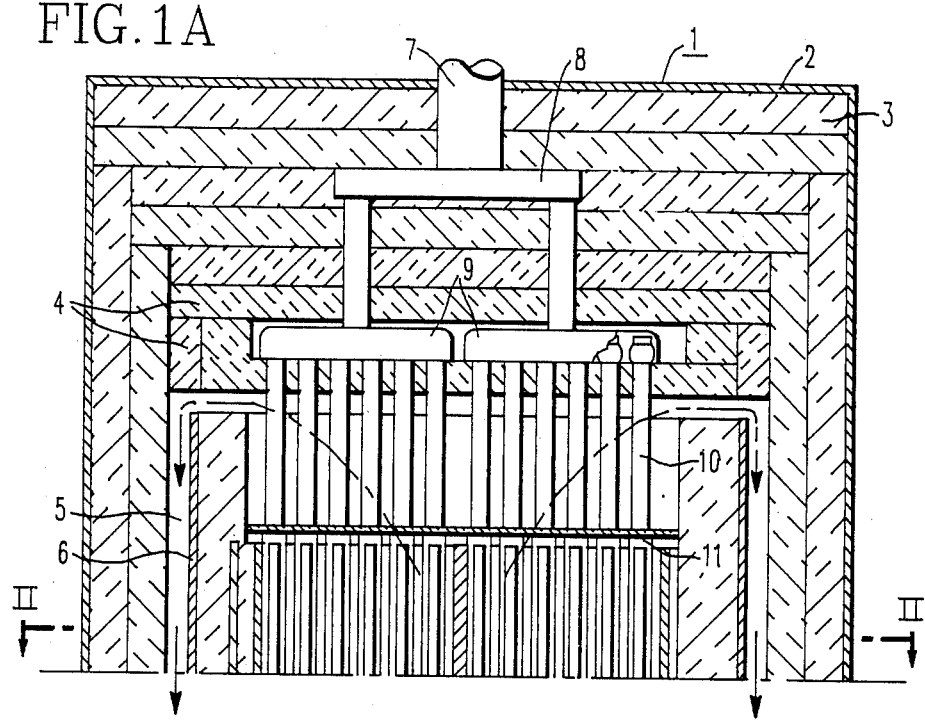
FIG. 1A is a side view in section of a certain presently preferred embodiment of a solid oxide fuel cell generator according to this invention.
Figure 2:
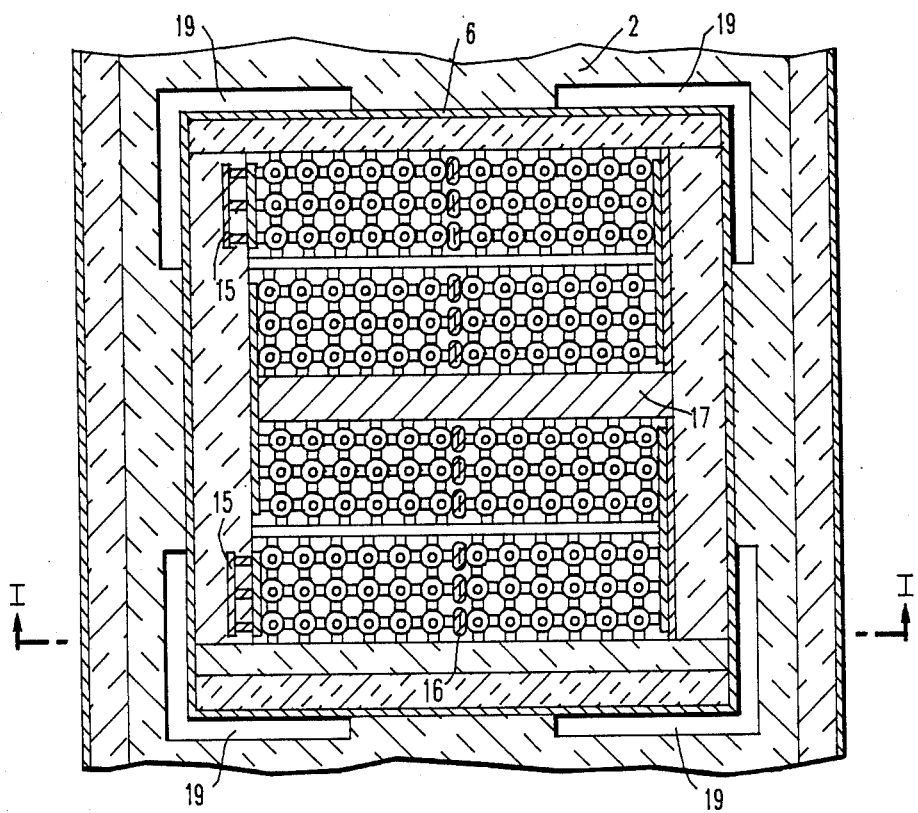

FIG. 2, which best illustrates the invention, is a plan view in section through lines II—II in FIG. 1A.

Figure 1B:
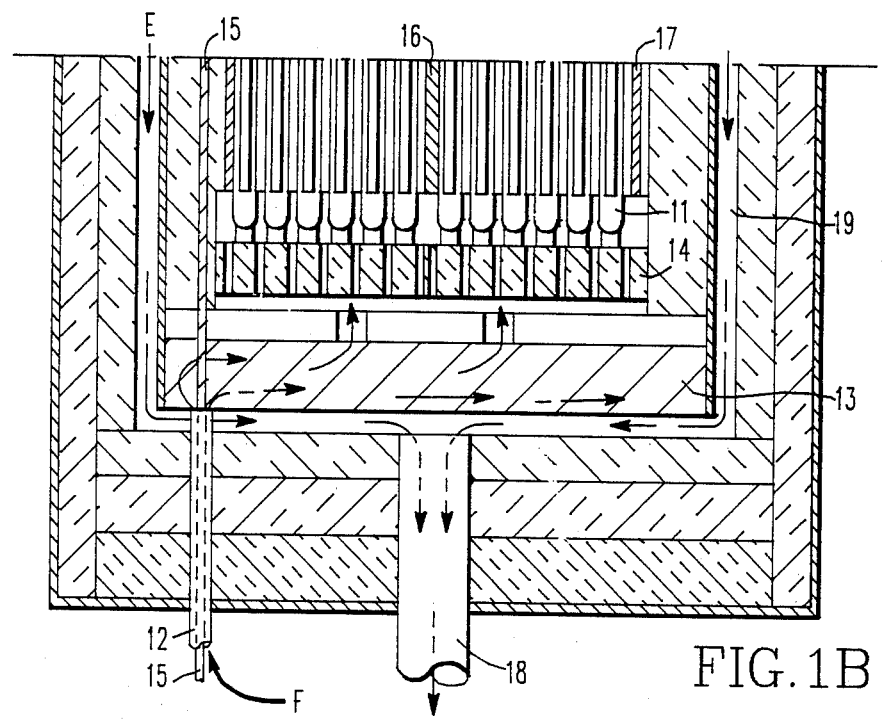
FIG. 1B shows the bottom portion of the generator shown in FIG. 1A.

In FIGS. 1A, 1B, and 2, an electrochemical cell generator, such as a solid oxide fuel cell generator 1, consists of an outer insulation container 2, typically made of 0.127 cm (0.05 inch) thick steel, which encloses various layers of insulation. Insulation 3 typically consists of alumina fiber insulation boards, with an approximate total insulation thickness of 12.7 cm. (5 inches). Smaller alumina fiber insulation boards 4 can be used where needed, as well as alumina fiber blanket insulation. Supporting the insulation and surrounding the fuel cell stack is an inner canister 6 (also called an exhaust passage wall) which are typically made of 0.094 cm (0.037 inch) thick Inconel (nickel-chromium alloy). The generator can be of a rectangular (including square) design having four sides meeting at four corners, as shown, and containing a multiplicity of electrically connected fuel cells.

In operation, an oxygen-containing gas is admitted to the generator through reactant gas inlet 7, where it passes to reactant gas distribution manifold 8 then to reactant gas inlet plenums 9. The gas then passes through reactant gas feed tubes 10 which take the gas into the multiplicity of tubular fuel cells 11. In FIG. 1B, a fuel gas F passes through fuel gas inlet annulus 12, around power lead 15, and into fuel gas manifold 13. The gas manifold, which is heated by exhaust gas E entering tube 18, may contain an internal fuel reforming medium such as nickel catalyst, making manifold 13 a reforming means. Fuel gas then passes through fuel gas distribution board 14 and around the outside of fuel cells 11, shown in FIG. 1B.

Oxygen from the oxygen-containing gas migrates through the component walls of the fuel cells 11, where it reacts with the fuel gas, generating heat and electricity. The electricity is removed from the generator through electric power lead 15, and a lead that is normally perpendicular to lead 15 but is not shown in FIGS. 1A or 1B. Electrical connections to the power leads are made through electrical bundle connections 16 and through series connection plate 17. The exhaust gases E that are formed after the reaction of the oxygen-containing gas with the fuel gas leave the fuel cell generator through exhaust gas tube 18.

Referring now to FIG. 2, it can be seen that there are four exhaust gas passages or channels 19, one at each corner of the fuel cell generator. Because the exhaust gases are very hot, the passage of the exhaust gases over the corners of the generators maintains the corners of the generator at a temperature higher than they would otherwise be. The channels are located so that more of the heat in the exhaust gases passes over the corners of the multiplicity of cells than over the remainder of the sides of the multiplicity of cells. This also reduces the thermal gradient between the cells at the inside of the generator and the cells at the periphery of the generator.

In an alternative arrangement, the exhaust gases pass over the entire periphery of the fuel cell generator, but a greater quantity of exhaust gas passes over the corners of the generator. In this way the cells at the periphery of the generator are maintained at the same temperature as the cells at the center of the generator, even when the cells at the periphery are not at a corner.

I claim:

1. In a solid oxide electrochemical cell generator of a rectangular design, having four sides meeting at four corners, and containing a multiplicity of electrically connected electrochemical cells, where a fuel gas is passed over one side of said cells, an oxygen-containing gas is passed into said cells, and fuel and oxygen-containing gas are reacted to form an exhaust gas, the improvement which comprises: channels 19 for passing at least a portion of said exhaust gas over the outside of the periphery of said multiplicity of cells, said channels being located so that more of the heat in said exhaust gases flows at the corners of said generator than over the remainder of the sides of said generator.

2. An improvement according to claim 1, wherein said fuel gas is reformed inside said generator beneath said multiplicity of electrochemical cells, where said channels pass into a reformer means, whereby heat in said exhaust gases is used in reforming said fuel gas.

3. An improvement according to claim 1, wherein said channels are cut into insulation around said multiplicity of electrochemical cells.

4. An improvement according to claim 1, wherein said electrochemical cells are fuel cells.

5. An improvement according to claim 2, wherein said reformer means contains reforming catalyst.

6. A method of operating a solid oxide fuel cell generator having a rectangular design, with four sides that meet at corners, and containing a multiplicity of electrically connected, tubular solid oxide fuel cells, where a fuel gas passes over one side of said cells, an oxygen-containing gas is passed into said cells, and fuel and oxygen-containing gas are reacted to form an exhaust gas, an improved method of reducing the thermal gradient between the cells at the inside of said generator and the cells at the periphery of said generator which comprises passing said exhaust gases over the sides of said generator, where a greater quantity of said exhaust gases are passed over the corners of said generator than over the remainder of the sides of said generator.

7. A method according to claim 6, wherein the heat of said exhaust gases is distributed over said sides so as to achieve a uniform temperature along said sides.

8. A method according to claim 6, wherein said exhaust gases are passed through channels in insulation surrounding the periphery of sid multiplicity of fuel cells.

9. A method according to claim 8, wherein said fuel gas is reformed inside said generator beneath said multiplicity of fuel cells, where said channels pass into a reformer means, whereby heat in said exhaust gases is used in reforming said fuel gas.

10. A method according to claim 9, wherein said reformer means contains reforming catalyst.

* * * * *